United States Patent [19]

Yamamoto

[11] 4,178,802
[45] Dec. 18, 1979

[54] APPARATUS FOR INDICATING QUANTITY OF FUEL OF A VEHICLE

[75] Inventor: Harushige Yamamoto, Tokyo, Japan

[73] Assignee: Niles Parts Co., Ltd., Japan

[21] Appl. No.: 890,948

[22] Filed: Mar. 28, 1978

[30] Foreign Application Priority Data

Apr. 20, 1977 [JP] Japan ............................. 52/49807[U]

[51] Int. Cl.² ............................................. G01F 23/10
[52] U.S. Cl. .................................................... 73/313
[58] Field of Search ..................... 73/313, 304 R, 308; 340/623–625; 338/33

[56] References Cited

U.S. PATENT DOCUMENTS

| | | |
|---|---|---|
| 1,154,162 | 9/1915 | Baker. |
| 2,448,783 | 9/1948 | DeGiers et al. |
| 2,533,091 | 12/1950 | Campani. |
| 2,555,166 | 5/1951 | Uehling ............................. 73/313 X |
| 3,482,200 | 12/1969 | Hamilton. |
| 3,813,941 | 6/1974 | Miguel et al. ......................... 73/313 |

OTHER PUBLICATIONS

"Fuel Indicating System Part 30-20", pp. 33-20-01 thru 05, Ford Motor Co., Sep. 1976.

*Primary Examiner*—Anthony V. Ciarlante
*Attorney, Agent, or Firm*—Lane, Aitken & Ziems

[57] ABSTRACT

An apparatus for indicating the quantity of fuel in a vehicle. A variable resistance device, consisting of a bar resistor having its ends short-circuited and a slide, provided with a float, mounted on a guide bar, converts changes in fuel quantity into changes in electrical resistance which are indicated by a fuel gauge. The variable resistance device has a non-linear change in resistance with the maximum resistance when the slide is positioned at the middle part of the resistor. The pointer of the fuel gauge moves in one direction and then reverses direction in response to the non-linear resistance change, with the one-half tank level being the turning point. A lamp in the fuel gauge is actuated by a detection switch when the one-half tank level is reached so that the lamp indicates to the vehicle operator that the gauge is measuring the remaining one-half of the fuel.

10 Claims, 2 Drawing Figures

APPARATUS FOR INDICATING QUANTITY OF FUEL OF A VEHICLE

CROSS-REFERENCE TO RELATED APPLICATION

Application Ser. No. 880,179, filed Feb. 22, 1978, now U.S. Pat. No. 4,157,038, discloses a related invention.

BACKGROUND OF THE INVENTION

1. Field of Invention

This invention relates generally to an apparatus for indicating quantity of fuel of a vehicle and more particularly to an improved apparatus for indicating quantity of the fuel of a vehicle by which the accuracy in indicating quantity of the fuel is improved twice compared to the conventional apparatus of the kind.

2. Brief Description of the Prior Art

An apparatus for indicating quantity of fuel of a vehicle according to the known art indicates fuel quantity by an angular displacement of a fuel gauge pointer in one direction only. In addition, a fuel gauge of the known kind tends to be miniaturised along the general trend of electrical attachments of vehicles in that direction, so that it is difficult to increase the extent of angular displacement of the pointer. As a result, an angular displacement of the pointer corresponding to the change in quantity of the fuel became relatively small and the accuracy in indicating fuel quantity was not always high. In the conventional art, the angular displacement at the most has been set at about 120° and no more. Accordingly, the angular displacement of the pointer corresponding to the change in fuel quantity was relatively small, which adversely affected accuracy in reading quantity of the fuel. Where such apparatus was used as a means of reading quantity of the fuel left in the vehicle, there was a danger that fuel was consumed unexpectedly while the vehicle was running. Therefore, the object of this invention is to improve the conventional apparatus for reading quantity of the fuel of a vehicle, to enhance the accuracy in reading fuel quantity, and to provide an apparatus having a wider range of applications to be described.

SUMMARY OF THE INVENTION

This invention comprises an improvement of an apparatus for indicating quantity of the fuel of a vehicle.

An improvement according to the present invention eliminates the weakness found in the conventional art as explained above. In an apparatus of this invention a variable resistor device, in which resistance varies corresponding to the quantity of fuel, is caused to effect a certain non-linear resistance change and increases the angular displacement of the pointer per unit quantity of the fuel, and thus enhances the accuracy in reading fuel quantity.

In the apparatus of this invention, a variable resistance device converts the change of fuel quantity in the fuel tank into a change of electric resistance. The variable resistance device consisting of a resistor and a slide which is slidably mounted on a guide bar. The resistor is shaped like a bar and has both ends short-circuited by a lead wire. The slide is provided with a float and is freely movable along the guide bar. The slide changes its position corresponding to the quantity of fuel in the fuel tank, and the change in fuel quantity is converted into a change of resistance between the terminals at the ends of the resistor and the guide bar.

Since the variable resistance device is constructed as explained above, it shows the maximum resistance when the slide is positioned at the middle part of the resistor. If it is so arranged that the slide rests at the middle part of the resistor when the fuel in the tank is one half the capacity of the tank, the resistance of the variable resistor device decreases according to the increase or decrease of the fuel relative to quantity of the fuel that is equal to one half of the tank capacity. Therefore, the pointer of the fuel gauge indicates the quantity of fuel by reciprocating displacements with the position where the fuel is one half the tank capacity being made the turning point.

At the same time, a detection switch is provided where the quantity of fuel is one half the tank capacity. The detection switch is positioned in such a manner that it is OFF when it is in contact with the fuel and ON when it is not. The detection switch may be a thermistor which corresponds to the temperature changes or a device which performs a switching operation through tangential contact with the fuel surface. A lamp is placed in the fuel gauge, and this lamp and the detection switch are connected in series to the power source of the apparatus, which the circuit containing the variable resistor body resistance device is connected in parallel to the circuit containing the lamp and the detection switch. The detection switch, as will be understood from the foregoing explanation, will be ON when the fuel is less than half the capacity of the tank and will light the lamp. Therefore, while the lamp is lighted, the fuel gauge indicates the quantity of fuel that is less than half the tank capacity, and when the lamp is not lighted, the fuel gauge indicates fuel quantity that is more than half the tank capacity. A sounding system may be used in place of the lamp.

The above and further objects and novel features of the invention may be more fully understood by reference to the drawings and the following detailed description. It should be understood, however, that the drawings are for reference only and are not to be construed as a definition of the invention.

BRIEF DESCRIPTION OF THE DRAWINGS

In the drawings wherein like parts are marked alike.

DESCRIPTION OF THE PREFERRED EMBODIMENT

This invention relates to an apparatus for indicating the quantity of fuel of a vehicle. It shows a superior performance and has a higher degree of accuracy in indicating fuel quantity.

Figure 1:
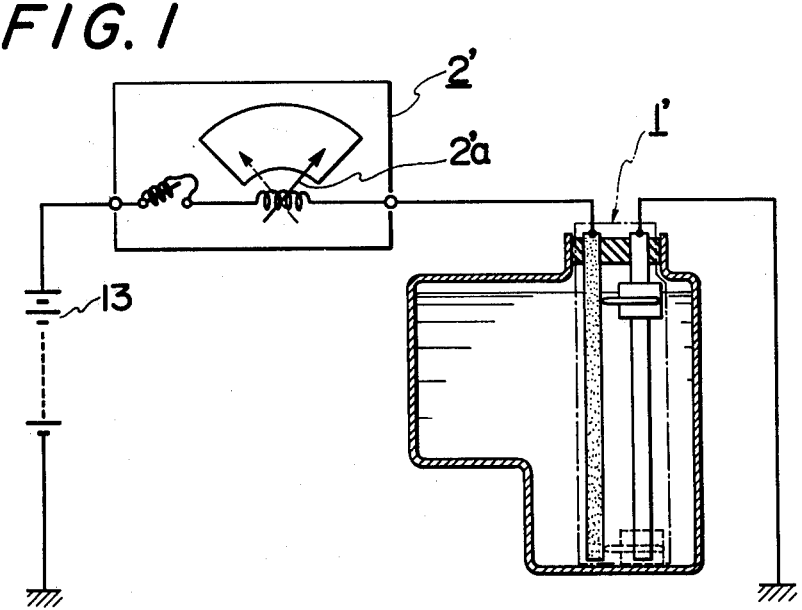
FIG. 1 is a schematic view of an apparatus for indicating quantity of the fuel according to the known art and FIG. 2 is a similar view of a preferred embodiment according to the present invention.

Referring now to FIG. 1 which shows an apparatus for indicating quantity of the fuel according to the known technology, a pointer 2'a of a fuel gauge 2' is displaced from a position shown by broken lines to a position indicated by full lines responsive to the change in resistance of a variable resistance device 1' in which resistance changes linearly responsive to quantity of the fuel. By this construction, an angular displacement of the pointer 2'a indicates quantity of the fuel. Further, the fuel gauge 2' is miniaturised, and the full angular displacement of the pointer is set at about 120°. Therefore, the angular displacement of the pointer 2'a corresponding to quantity of the fuel is relatively small and the accuracy in reading the quantity of fuel is low. Thus, if such an apparatus is used, for example, for the purpose of reading quantity of the fuel left in the vehicle, the fuel may be unexpectedly exhausted while the vehicle is running which could cause a traffic accident.

Now, this invention eliminates the defects found with the conventional apparatus of the kind, and an apparatus according to this invention includes a variable resistance device constructed so that non-linear resistance changes occur in responsive to changes in the quantity of fuel, thus enlarging the angular displacement of the pointer of the fuel gauge per unit quantity of the fuel and raising accuracy in reading the quantity of the fuel.

Figure 2:
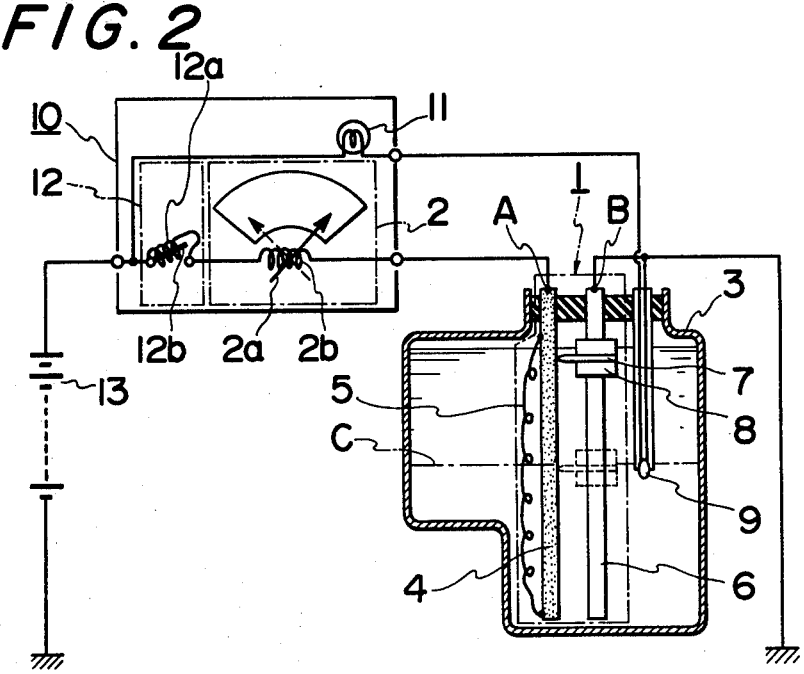

Referring now to FIG. 2, in fuel tank 3 there is a variable resistance device 1 which comprises slide 7 having a float 8, a guide bar 6 electrically connected to slide 7 on which slide 7 is slidably mounted, and a resistor 4 of which both ends are connected by lead wire 5, in electrical contact with slide 7. Said variable resistance device 1 converts the change in the quantity of fuel into a change in electric resistance between terminals A and B, connected to end portions of resistor 4 and guide bar 6, respectively. This change in electrical resistance occurs of an upward or downward displacement of the slide 7 with float 8, corresponding to changes in the quantity of fuel in tank 3.

A detection switch 9 is placed in tank 3 at a position corresponding to the middle part of the resistor 4 arranged so as to be OFF when it is in contact with the fuel and ON when it is not. The detection switch 9 may be a thermistor which performs a switching operation responsive to the temperature change or a switch which does the switching operation by a tangential contact with the fuel surface.

A fuel gauge 2 includes a pointer 2a, a bimetallic strip which changes its position corresponding to the current of electricity passing through a heat line 2b, giving an indication corresponding to the current of electricity passing therethrough. Electricity is fed to the heat line 2b through a gauge regulator 12.

Gauge regulator 12 which has an opening and closing cycle of short duration, and which supplies constant electric power per unit time to fuel gauge 2, comprises a heat line 12a which is connected to, and placed between, the contacts which are usually open, with a bimetallic strip 12b being connected to one of the contacts. When electric voltage is applied to these contacts, the heat line 12a is heated, and after lapse of some time, the bimetallic strip 12b is caused to bend and close the contacts. Then, the heat line 12a becomes non-conductive, and the bimetallic strip 12b is cooled by ambient air. After lapse of a certain length of time, strip 12b resumes its original condition and stands up and thus opening contacts which causes the heat line 12a to become conductive again. This pattern is repeated, and the bimetallic strip 12b constantly performs opening and closing operations.

A luminous body such as lamp 11 is provided on an indicator panel of the fuel gauge 2. A sounding system may be used in place of the lamp.

Power source 13, gauge regulator 12, fuel gauge 2 and variable resistance device 1 are connected in series, and lamp 11 and switch 9 are connected in series to power source 13. Thus, the circuit containing gauge regulator 12, fuel gauge 2, and variable resistance device 1 is in parallel with the circuit containing lamp 11 and switch 9.

The operation of the apparatus will now be described. Variable resistance device 1 converts changes in quantity of fuel in tank 3 into changes in electric resistance between terminals A and B, as mentioned above, because resistor 4 has both its ends short-circuited by lead wire 5, the maximum resistance occurs when slide 7 moves to a position at the middle part of resistor 4. In an actual application, it is convenient to have this middle part of resistor 4 indicate the quantity of fuel that is one half the capacity of the tank. Taking an example, if the tank capacity is 20 liter, then the quantity of fuel in tank 3 will be 10 liter in FIG. 2 when the fuel surface is denoted by C. If it is so arranged that slide 7 comes to a position at middle part of the resistor 4 at this condition, the resistance of variable resistance device 1 gradually decreases corresponding to any increase or decrease of quantity in the fuel with respect to the 10 liter being made.

Therefore, pointer 2a of fuel gauge 2 is displaced reciprocatingly corresponding to the quantity of the fuel with the position where the fuel quantity is 10 liter being made the turning point and numerals or gradings on a panel of the fuel gauge indicating the quantity of fuel.

Further, detection switch 9 will be ON when the quantity of the fuel decreases to less than 10 liter and will light lamp 11. Therefore, when lamp 11 is lighted, the fuel gauge 2 indicates quantity of the fuel which is less than 10 liter. When lamp 11 is not lighted, fuel gauge 2 indicates the fuel quantity which is more than 10 liter. A buzzer may be used in place of lamp 11 to perform the same function.

This invention which has the construction and working mode as explained above has a technical effect to be described below.

Since the apparatus indicates the change in quantity of the fuel by means of reciprocating displacements of the fuel gauge pointer, the degree of displacement of the pointer per unit quantity of the fuel is twice as much compared to that of the known art and is therefore superior in its accuracy in indicating fuel quantity.

Furthermore, by lighting of lamp 11, it is easy to see what is meant by any reciprocating displacement of pointer 2a in terms of the quantity of fuel. Particularly, when lamp 11 is luminous, it shows that fuel quantity is less than a predetermined quantity so it serves the purpose of warning the driver of the vehicle that the fuel is running out. As mentioned before, a buzzer installed in place of the lamp will perform the same function, or a buzzer may be used together with the lamp.

This will suggest a wide range of application of the apparatus for indicating quantity of the fuel according to the present invention.

Thus, the invention having been described in its best embodiment and mode of operation, that which is desired to be claimed by Letters Patent is:

1. An apparatus for indicating the quantity of liquid in a container, comprising:
  (1) a gauge adapted to indicate the quantity of liquid, the gauge having a first side connected in electrical circuit with a power source and a second side connected in electrical circuit with a variable resistance device;
  (2) a variable resistance device comprising:
    (a) a resistance means having a first end connected in electrical circuit with the gauge, the resistance means having a point near the first end short-circuited to a point near a second end thereof;

(b) a float responsive to the liquid level in the container; and (c) a contact means responsive to the float and further connected in electrical circuit with the resistance means and with a source of reference potential, whereby in operation the gauge indicates liquid quantity in response to changes in resistance in the variable resistance device, such changes including at least one non-linear change in resistance occurring at a predetermined liquid level thereby causing a reciprocal displacement in the gauge; and (3) a warning indication means connected in electrical circuit with the power source and with a detector switch means responsive to the predetermined liquid level, whereby a warning indication occurs when the predetermined liquid level is reached.

2. The apparatus of claim 1 wherein the resistance means comprises a bar-shaped resistor, the contact means comprises a slide in electrical contact with the resistor and the slide is further slidably mounted on a conductive guide bar electrically connected to the source of reference potential, and the warning indication means comprises a device selected from the group consisting of a lamp, a buzzer, or a lamp and a buzzer.

3. The apparatus of claim 2 wherein the slide is further mounted on the float.

4. The apparatus of claim 1, claim 2, or claim 3, further comprising a gauge regulator electrically connected to the power source and to the gauge to supply constant electric power per unit of time.

5. The apparatus of claim 1, claim 2, or claim 3, wherein the detector switch means is a device selected from the group consisting of a thermistor or a switch which performs switching operations through tangential contact with the surface of the liquid, when the predetermined level of liquid in the container is the one-half full level.

6. An apparatus for indicating the quantity of fuel in a vehicle's fuel tank, comprising the combination of:

(1) a power source;

(2) a fuel gauge including a pointer adapted to indicate the quantity of fuel, the fuel gauge having a first terminal electrically connected to the power source and a second terminal electrically connected to a variable resistance device;

(3) a variable resistance device comprising:

(a) a resistance means having a first end electrically connected to the gauge, the resistance means having a point near the first end short-circuited to a point near a second end thereof;

(b) a float responsive to the fuel level in the tank;

(c) a contact means responsive to the float and in electrical contact with the resistance means and in electrical circuit with a source of reference potential, whereby in operation the gauge indicates fuel quantity in response to change in resistance of the variable resistance device, such changes including at least one non-linear change in resistance occurring at a predetermined fuel level thereby causing a reciprocal displacement in the gauge; and (4) a warning indication means connected in electrical circuit with the power source and with a detector switch means adapted to be responsive to the predetermined fuel level, whereby a warning indication occurs when the predetermined fuel level is reached.

7. The apparatus of claim 6, wherein the resistance means comprises a bar-shaped resistor, the contact means comprises a slide in electrical contact with the resistor and the slide is slidably mounted on a conductive guide bar electrically connected to the source of reference potential, and the warning indication means comprises a device selected from the group consisting of a lamp, a buzzer, or a lamp and a buzzer.

8. The apparatus of claim 7, wherein the slide is further mounted on the float.

9. The apparatus of claim 6, claim 7, or claim 8, further comprising a gauge regulator electrically connected to the power source and to the gauge to supply constant electrical power per unit of time.

10. The apparatus of claim 6, claim 7, or claim 8, wherein the detector switch means is a device selected from the group consisting of a thermistor or a switch which performs switching operations through tangential contact with the surface of the liquid when the predetermined level of liquid in the container is the one-half full level.

* * * * *